(12) United States Patent
Okada

(10) Patent No.: US 9,030,765 B2
(45) Date of Patent: May 12, 2015

(54) OPTICAL APPARATUS INCLUDING DECENTERING/TILTING ADJUSTMENT MECHANISM

(71) Applicant: Canon Kabushiki Kaisha, Tokyo (JP)

(72) Inventor: Tadanori Okada, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 77 days.

(21) Appl. No.: 13/895,638

(22) Filed: May 16, 2013

(65) Prior Publication Data

US 2013/0308211 A1 Nov. 21, 2013

(30) Foreign Application Priority Data

May 16, 2012 (JP) .................. 2012-112299

(51) Int. Cl.
*G02B 7/02* (2006.01)
*G03B 3/10* (2006.01)
*G03B 43/00* (2006.01)
*G03B 17/14* (2006.01)
*G03B 21/14* (2006.01)

(52) U.S. Cl.
CPC .. *G02B 7/02* (2013.01); *G03B 3/10* (2013.01); *G03B 17/14* (2013.01); *G03B 21/142* (2013.01); *G03B 43/00* (2013.01); *G03B 2205/00* (2013.01); *G02B 7/023* (2013.01)

(58) Field of Classification Search
USPC .......................... 359/811, 813, 815, 819–824
See application file for complete search history.

(56) References Cited

FOREIGN PATENT DOCUMENTS

| JP | 07-113934 A | 5/1995 |
| JP | 2007-219405 A | 8/2007 |
| JP | 2010-191070 | * 9/2010 ............... G02B 7/02 |

* cited by examiner

*Primary Examiner* — Joseph P Martinez
*Assistant Examiner* — Brandi Thomas
(74) *Attorney, Agent, or Firm* — Rossi, Kimms & McDowell LLP

(57) ABSTRACT

The optical apparatus includes a first holding member holding an optical element, a second holding member holding the first holding member, and an adjustment mechanism. The adjustment mechanism includes a fulcrum portion provided at one place in a circumferential direction and connecting the first and second holding member so as to allow movements of the first holding member in decentering and tilting correction directions with respect to the second holding member. The adjustment mechanism further includes two decentering adjustment portions arranged in the circumferential direction and each including a first adjusting member, and two tilting adjustment portions arranged in the circumferential direction and each including a second adjusting member. The first and second adjusting members each have an eccentric portion eccentric with respect to its rotation center portion.

7 Claims, 7 Drawing Sheets

OPTICAL APPARATUS INCLUDING DECENTERING/TILTING ADJUSTMENT MECHANISM

BACKGROUND OF THE INVENTION

1. Field of the Invention

The present invention relates to an optical apparatus such as a camera and an interchangeable lens, and particularly to an optical apparatus provided with an adjustment mechanism to correct decentering (optical axis displacement) and titling (leaning) of an optical element.

2. Description of the Related Art

In optical systems to be used for optical apparatuses, manufacturing error or the like causes decentering or tilting of an optical element such as a lens with respect to an optical axis of the optical system, which deteriorates optical performance. Thus, optical apparatuses provided with an adjustment mechanism to correct such decentering and titling of the optical element have been proposed.

For example, Japanese Patent Laid-Open No. 2007-219405 discloses an optical apparatus provided with an adjustment mechanism that includes three adjusting members (such as eccentric cams) to be used for decentering adjustment of one lens holding member and other three adjusting members (such as eccentric cams) to be used for tilting adjustment of the one lens holding member.

However, the adjustment mechanism disclosed in Japanese Patent Laid-Open No. 2007-219405 includes the six adjusting members in total for the decentering adjustment and the tilting adjustment, which may prevent miniaturization of the optical apparatus.

BRIEF SUMMARY OF THE INVENTION

The present invention provides an optical apparatus provided with a compact decentering/tilting adjustment mechanism allowing decentering adjustment and tilting adjustment of an optical element.

The present invention provides as one aspect thereof an optical apparatus including a first holding member holding an optical element, a second holding member holding the first holding member, and an adjustment mechanism to adjust positions of the first holding member in a decentering correction direction and in a tilting correction direction with respect to the second holding member. The adjustment mechanism includes a fulcrum portion provided at one place in a circumferential direction of the first and second holding members and connecting the first and second holding member so as to allow movements of the first holding member in the decentering correction direction and the tilting correction direction with respect to the second holding member, two decentering adjustment portions provided at two places other than that of the fulcrum portion in the circumferential direction and each causing the first holding member to move in the decentering correction direction with respect to the second holding member in response to rotation of a first adjusting member including a first rotation center portion about which the first adjusting member is rotated and a first eccentric portion eccentric with respect to the first rotation center portion, and two tilting adjustment portions provided at two places other than that of the fulcrum portion in the circumferential direction and each causing the first holding member to move in the tilting correction direction with respect to the second holding member in response to rotation of a second adjusting member provided with a second rotation center portion about which the second adjusting member is rotated and a second eccentric portion eccentric with respect to the second rotation center portion.

Other aspects of the present invention will become apparent from the following description and the attached drawings.

DETAILED DESCRIPTION OF THE PREFERRED EMBODIMENTS

Exemplary embodiments of the present invention will hereinafter be described with reference to the accompanying drawings.

Embodiment 1

Figure 1:
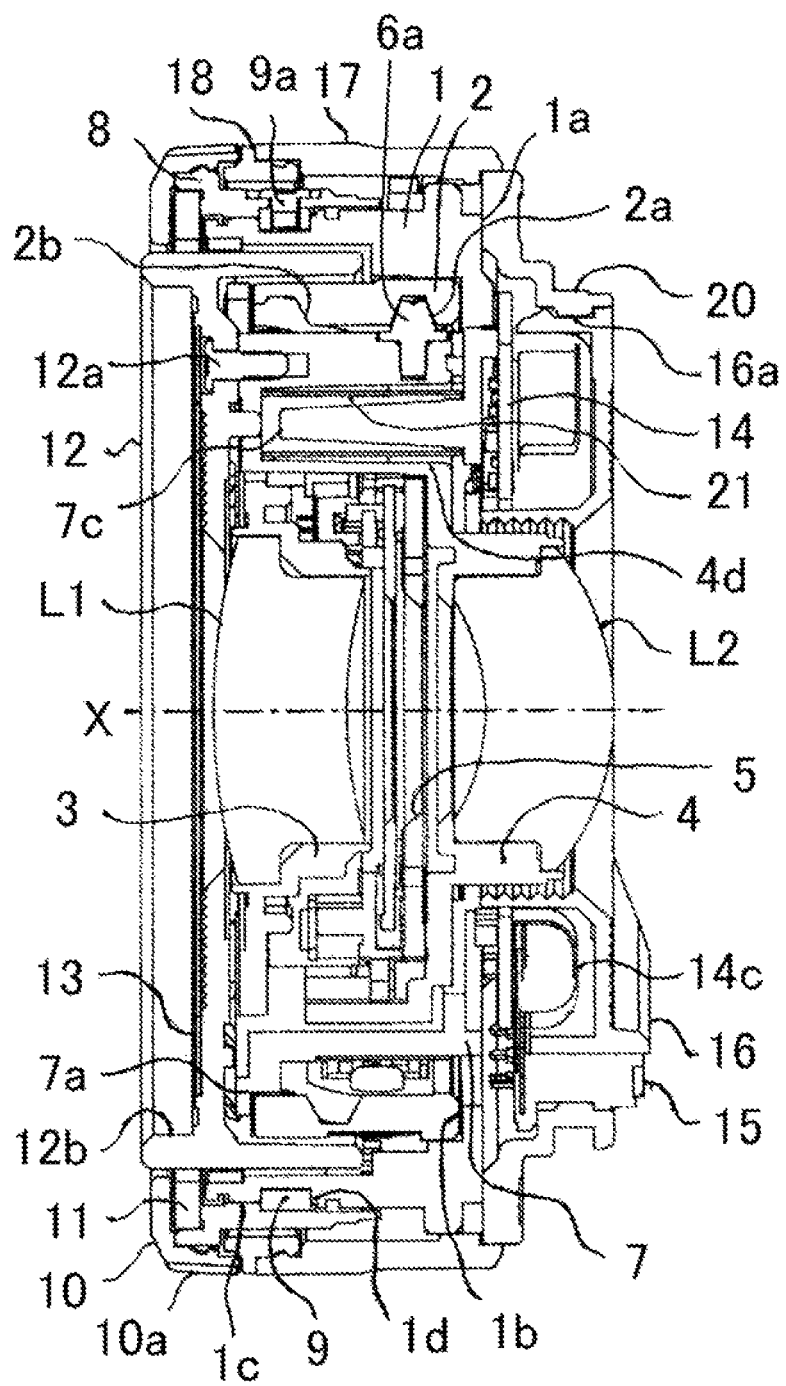
FIG. 1 is a longitudinal sectional view of an interchangeable lens (in an infinite focusing state) that is Embodiment 1 of the present invention.
Figure 2:
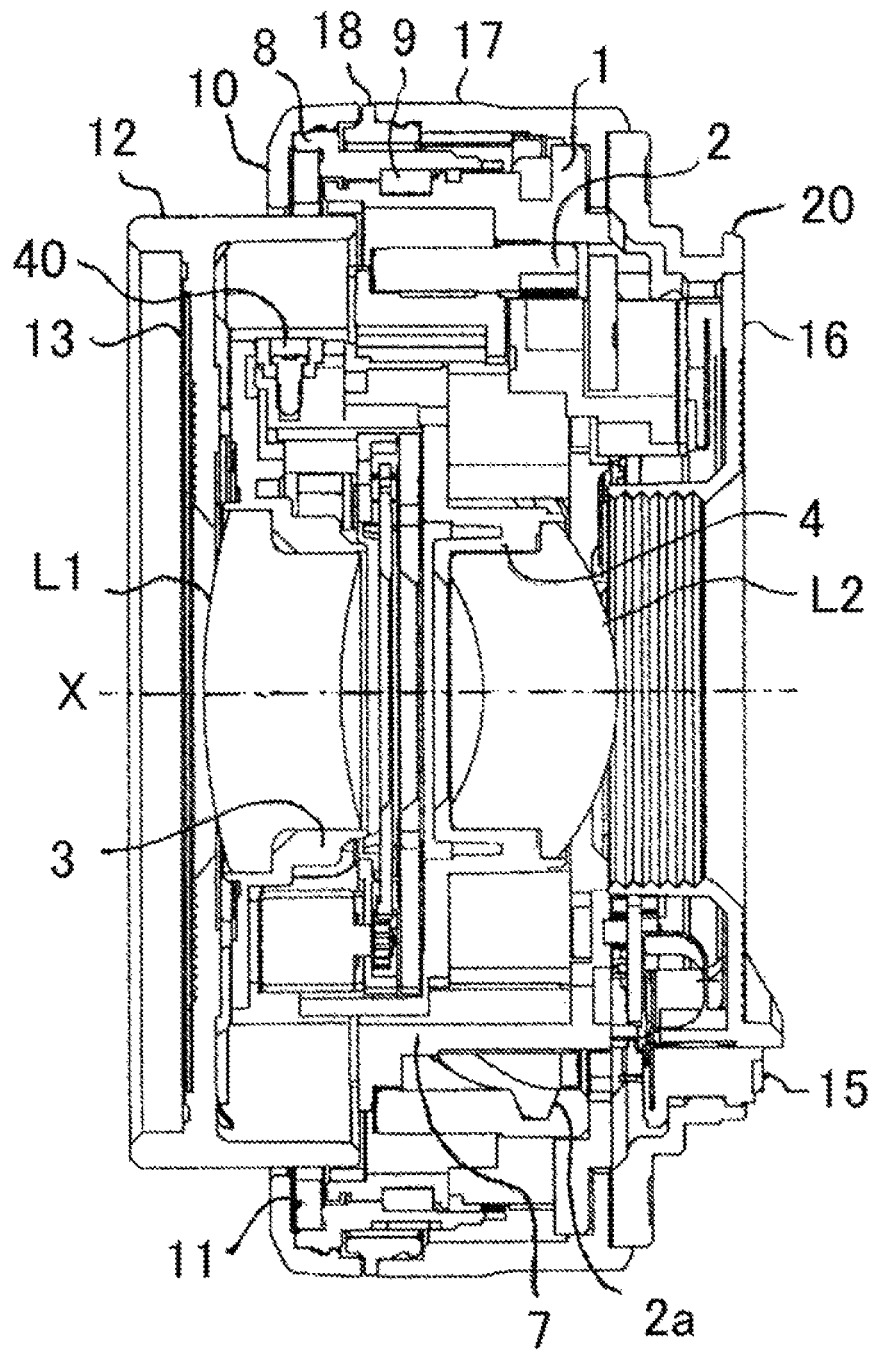
FIG. 2 is a longitudinal sectional view of the interchangeable lens (in a close focusing state) of Embodiment 1.
Figure 3:
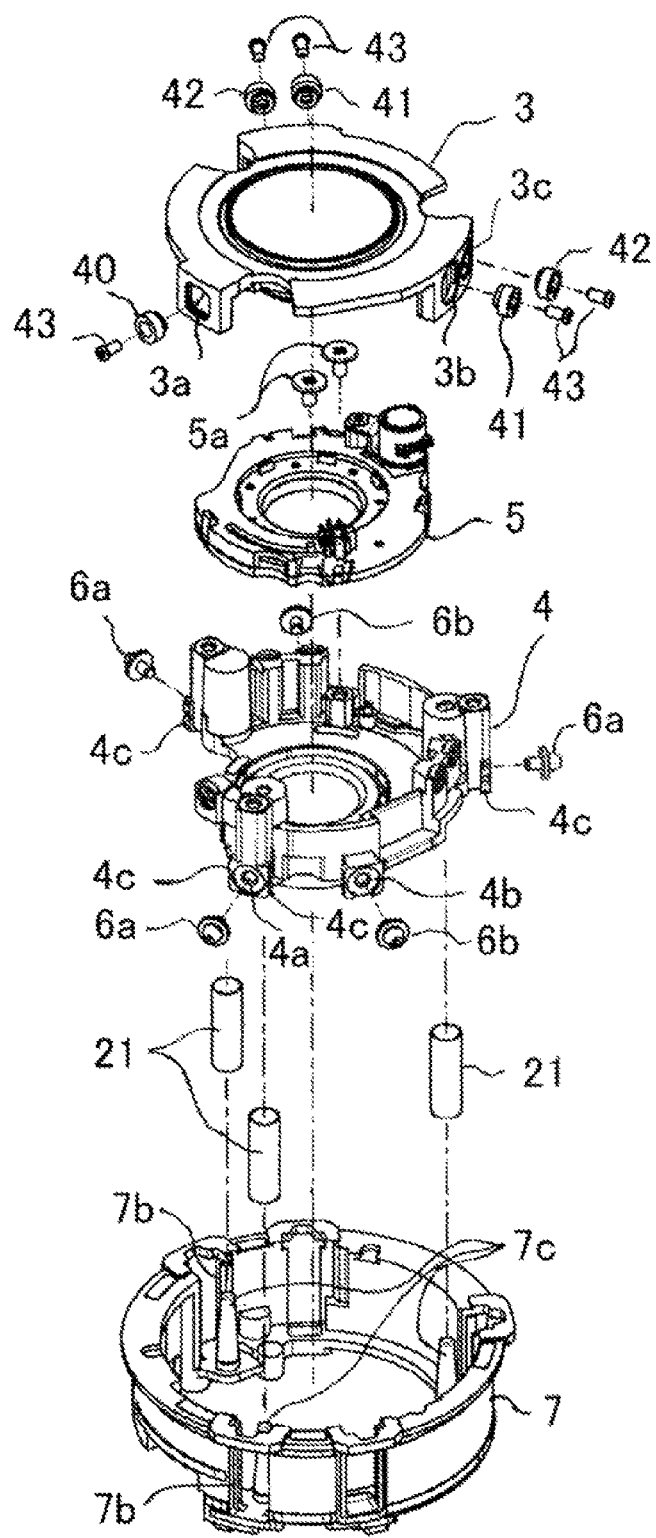
FIG. 3 is an exploded perspective view of a lens barrel part including a front/rear lens unit provided with a decentering/tilting adjustment mechanism, in the interchangeable lens of Embodiment 1.
Figure 4:
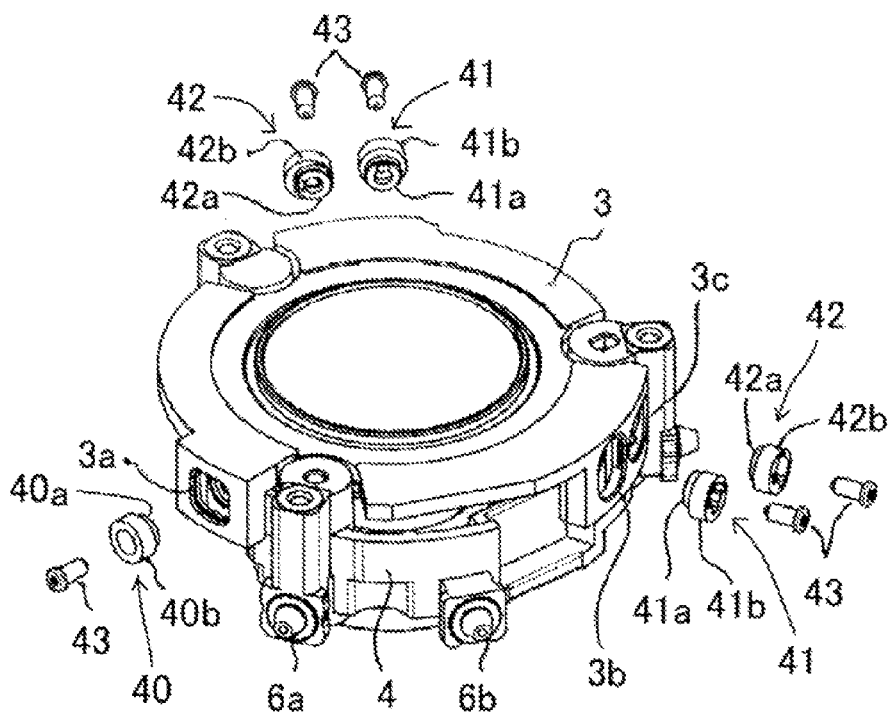
FIG. 4 is a perspective view showing a configuration of the front/rear lens unit.

FIGS. 1 and 2 show a configuration of an interchangeable lens as an optical apparatus that is a first embodiment (Embodiment 1) of the present invention. FIG. 1 shows a longitudinal section of the interchangeable lens in an infinite focusing state, and FIG. 2 shows a longitudinal section thereof in a close focusing state. Moreover, FIG. 3 is an exploded view of a main part of the interchangeable lens, and FIG. 4 shows a front/rear lens unit included in the main part.

In these figures, reference character X denotes an optical axis of an image taking optical system housed in the interchangeable lens. In the following description, a direction in which the optical axis X extends is referred to as "an optical axis direction", and a direction in which a circle extends around the optical axis is referred to as "a circumferential direction".

Reference numeral 1 denotes a fixed barrel as a main body of the interchangeable lens. A mount member 20 to be coupled with an image pickup apparatus (not shown) such as a digital camera is fixed to a rear end (image side end) 1a of the fixed barrel 1 with screws. Reference numeral 7 denotes a guiding barrel, which is disposed inside the fixed barrel 1 and fixed thereto with screws. Reference numeral 2 denotes a cam ring, which is disposed between an outer circumferential surface of the guiding barrel 7 and an inner circumferential surface of the fixed barrel 1. The cam ring 2 is held rotatably in the circumferential direction at a fixed position in the optical axis direction by being sandwiched between a flange portion 7a formed at a front end (object side end) of an outer circumferential part of the guiding barrel 7 and a contact surface 1b formed at a rear end of an inner circumferential part of the fixed barrel 1. The cam ring 2 includes, at five circumferential places in its inner circumferential surface, three tapered cam groove portions 2a and two tapered cam groove portions 2b whose each cam surface is formed as a tapered surface.

Reference numeral 3 denotes a front lens holding frame (front lens barrel) as a first holding member, which holds at its inner circumferential part a front group lens L1 as an optical element. Reference numeral 4 denotes a rear lens holding frame (rear lens barrel) as a second holding member, which holds at its inner circumferential part a rear group lens L2. Reference numeral 5 denotes an electromagnetic aperture stop unit, which is fixed to the rear lens folding frame 4 with screws 5a as shown in FIG. 3. The front group lens L1, the rear group lens L2 and the electromagnetic aperture stop unit 5 constitute the image taking optical system.

The front lens holding frame 3 is provided with a reference hole portion 3a, two axially elongated hole portions 3b and two circumferentially elongated hole portions 3c, which constitute a decentering/tilting adjustment mechanism. The rear lens holding frame 4 is provided with a reference supporting member 40, two decentering adjusting eccentric cams 41 and two tilting adjusting eccentric cams 42, which also constitute the decentering/tilting adjustment mechanism. The front lens holding frame 3 and the rear lens holding frame 4 are connected with each other in the optical axis direction by engagement of the reference supporting member 40 with the reference hole portion 3a and engagement of the two tilting adjusting eccentric cams 42 with the two circumferentially elongated hole portions 3c, thereby being movable integrally in the optical axis direction in response to rotation of the cam ring 2. The two decentering adjusting eccentric cams 41 engage with the two axially elongated hole portions 3b. A detailed description of the decentering/tilting adjustment mechanism will be made later.

In the following description, the front lens holding frame 3 holding the front group lens L1, the rear lens holding frame 4 holding the rear group lens L2, the electromagnetic aperture stop unit 5 and the decentering/tilting adjustment mechanism are collectively referred to as "a front/rear lens unit".

The rear lens holding frame 4 is provided with, at three circumferential places in its outer circumference part, cam follower holding hole portions 4a. Center portions of three cam followers 6a are press-fitted into the cam follower holding hole portions 4a, and thereby the cam followers 6a are attached to the rear lens holding frame 4. The three cam followers 6a each include a follower portion having a circular truncated cone shape; the follower portions respectively engage with the three tapered cam groove portions 2a formed in the cam ring 2.

Moreover, the rear lens holding frame 4 is provided with, at two circumferential places in its outer circumference part, cam follower holding hole portions 4b. Center portions of two cam followers 6b are press-fitted into the cam follower holding hole portions 4b, and thereby the cam followers 6b are attached to the rear lens holding frame 4. The two cam followers 6b each include a follower portion having a circular truncated cone shape; the follower portions are respectively inserted into the two tapered cam groove portions 2b formed in the cam ring 2. The cam followers 6b are not in contact with the cam surfaces of the two tapered cam groove portions 2b in a normal state, but are brought into contact therewith by external impact to prevent the three cam followers 6a from disengaging from the tapered cam groove portions 2a.

In the rear lens holding frame 4, key portions 4c are formed in both circumferential sides of each portion where the cam follower 6a is attached. The key portions 4c engage, straight-movably in the optical axis direction, with straight groove portions 7b formed in the guiding barrel 7, which enables straight guiding of the rear lens holding frame 4 in the optical axis direction by the straight groove portions 7b (that is, by the guiding barrel 7).

With the above configuration, rotation of the cam ring 2 in the circumferential direction moves, by a cam lift of each tapered cam groove portion 2a, the front/rear lens unit with the cam followers 6a, which enables focusing between an infinite end and a close end.

Moreover, in FIG. 3, reference numeral 21 denotes coil springs, which are disposed at three circumferential places. A rear end of each coil spring 21 is in contact with the guiding barrel 7, and three bosses (protrusions) 7c formed in the guiding barrel 7 are respectively inserted inside the three coil spring 21. On the other hand, a front end of each coil spring 21 is in contact with a bottom of a hole portion 4d formed in the rear lens holding frame 4. With this configuration, the three coil springs 21 bias the entire front/rear lens unit frontward with respect to the guiding barrel 7 and bias the cam ring 2 frontward through the cam followers 6a. With this biasing by the coil springs 21, the came ring 2 is always pressed to the flange portion 7a of the guiding barrel 7, and each cam follower 6a is also always pressed to a front side cam surface of the tapered cam groove portion 2a, thereby makes it possible to prevent deterioration of optical performance due to minute displacement of the front/rear lens unit in the optical axis direction. Inserting the front end of the coil spring 21 into the hole portion 4d and supporting an outer circumferential edge of the coil spring 21 by an inner circumferential surface of the hole portion 4d enables stable generation of biasing force without buckling of the coil spring 21.

In FIGS. 1 and 2, reference numeral 8 denotes a fixed position rotative ring, whose inner circumferential part is fitted to an outer circumferential part 1c of the fixed barrel 1. A metallic key 9 having a C-shape is fixed to the inner circumferential part of the fixed position rotative ring 8 with screws 9a and engages with a circumferential groove portion 1d formed in an outer circumferential surface of the fixed barrel 1. This configuration holds the fixed position rotative ring 8 rotatably in the circumferential direction at a fixed position in the optical axis direction.

Reference numeral 10 denotes a focus operating ring, which is adhesively fixed to an outer circumferential part of the fixed position rotative ring 8 and is provided with a knurling 10a to facilitate manual focusing operation thereof. Reference numeral 11 denotes a metallic reinforcing ring, which is held between the fixed position rotative ring 8 and the focus operating ring 10 and is adhesively fixed thereto.

Reference numeral 12 denotes a filter frame, which is fixed to the rear lens holding frame 4 with a screw 12a. The filter frame 12 is provided, at its front end, with a screw portion 12b to which an accessory such as an optical filter or a lens hood can be attached. Reference numeral 13 denotes a name ring on which a model name of the interchangeable lens is printed, which is fixed to the filter frame 12 with an adhesive tape and covers over the screw 12a.

Reference numeral 14 denotes a substrate on which electronic parts are mounted, which is fixed to the fixed barrel 1 with screws. The substrate 14 is provided with connectors for enabling electrical connection with the above-mentioned electromagnetic aperture stop unit 5, a motor unit 30 (described later), an A/M switch (not shown) and others. A microcomputer (not shown) mounted on the substrate 14 switches a focusing mode between autofocus (A) and manual focus (M) in response to receipt of an A/M switch signal from the A/M switch and controls drive of the electromagnetic aperture stop unit 5 and drive of the motor unit 30.

Moreover, the substrate 14 is connected with contact parts 15 through a flexible printed wiring board 14c. The microcomputer performs communication with the image pickup apparatus to which the interchangeable lens is attached via the mount member 20 and receives power supply from the image pickup apparatus, through the contact parts 15. Reference numeral 16 denotes a rear cap, which is fitted to an inner circumferential part of the mount member 20 and fixed thereto by elastic force of its claws 16a.

Reference numeral 17 denotes an exterior ring, which is fixed to the fixed barrel 1 with screws together with the mount member 20. A metallic reinforcing ring 18 is adhesively fixed to a front end of the exterior ring 17 to prevent deformation thereof.

Figure 5:
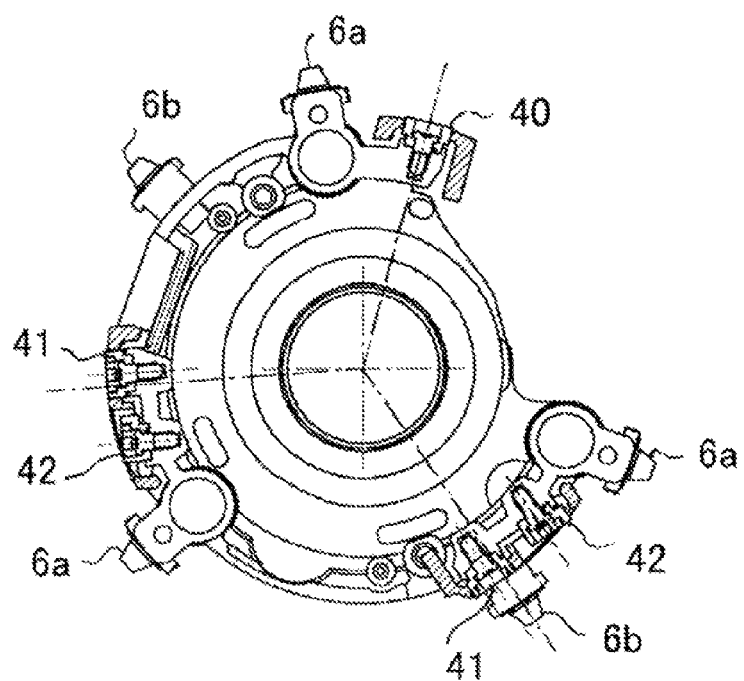
FIG. 5 is a cross-sectional view of the front/rear lens unit.
Figure 6:
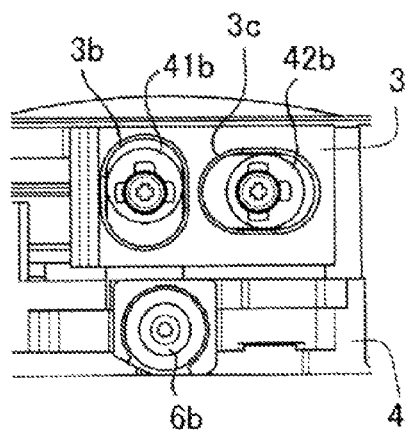
FIG. 6 is a side view of decentering and tilting adjustment portions of the adjustment mechanism.
Figure 7:
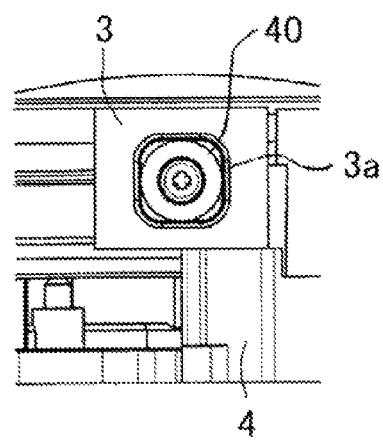
FIG. 7 is a side view of a fulcrum portion of the adjustment mechanism.

Next, a detailed description of the decentering/tilting adjustment mechanism will be made with reference to FIGS. 4 to 7. FIG. 4 is the above-mentioned exploded view of the decentering/tilting adjustment mechanism, and FIG. 5 shows a cross-section of the decentering/tilting adjustment mechanism, passing through a center of the reference supporting member 40 and being orthogonal to the optical axis X. FIG. 6 shows the decentering adjusting eccentric cam 41, the tilting adjusting eccentric cam 42, the axially elongated hole portions 3b and the circumferentially elongated hole portions 3c viewed from an axial direction of each eccentric cam. FIG. 7 shows the reference supporting member 40 and the reference hole portion 3a viewed from an axial direction of the reference supporting member 40.

The decentering/tilting adjustment mechanism moves the front lens holding frame 3, that is, adjusts a position of the first lens holding frame 3 with respect to the rear lens holding frame 4 such that an optical axis of the front group lens L1 coincides with a reference optical axis that is an optical axis of the rear group lens L2.

Specifically, the decentering/tilting adjustment mechanism translates (moves parallel with) the front lens holding frame 3 with respect to the rear lens holding frame 4 in directions orthogonal to the reference optical axis (that is, in radial directions of each lens) to correct displacement of the optical axis (that is, decentering) of the front group lens L1 with respect to the reference optical axis in those directions. In the following description, of the directions orthogonal to the reference optical axis, a direction in which a decentering amount decreases is referred to as "a decentering correction direction". Moreover, decentering of the first group lens L1 with respect to the reference optical axis is referred to as "decentering of the front lens holding frame 3" with respect to the rear lens holding frame 4.

The decentering/tilting adjustment mechanism further rotationally moves the front lens holding frame 3 with respect to the rear lens holding frame 4 in directions in which the optical axis of the first group lens L1 changes (rotates) to correct tilting of the optical axis (that is, leaning) of the front group lens L1 with respect to the reference optical axis in those directions. In the following description, of the directions in which the optical axis of the first group lens L1 rotates, a direction in which a tilting amount decreases is referred to as "a tilting correction direction". Moreover, tilting (leaning) of the first group lens L1 with respect to the reference optical axis is referred to as "tilting of the front lens holding frame 3" with respect to the rear lens holding frame 4.

The rear lens holding frame 4 is provided with, at five circumferential places in its outer circumference part, the above-mentioned one reference supporting member 40 constituting part of a fulcrum portion at one place, the above-mentioned two decentering adjusting eccentric cams 41 serving as first adjusting members at two places and the above-mentioned two tilting adjusting eccentric cams 42 serving as second adjusting members at two places. These reference supporting member 40 have a center portion 40a, and the eccentric cams 41 and 42 have rotation center portions (first and second rotation center portions; each hereinafter simply referred to as "a center portion") 41a and 42a. The center portions 40a, 41a and 42a are inserted into hole portions formed at the five circumferential places in the outer circumference part of the rear lens holding frame 4 and are attached thereto with screws 43. The decentering adjusting eccentric cams 41 and the tilting adjusting eccentric cams 42 are attached to the rear lens holding frame 4 rotatably about the center portions 41a and 42a.

On the other hand, the front lens holding frame 3 is provided with, at three circumferential places in its outer circumference part, wall portions extending in the optical axis and circumferential directions. Of the three wall portions, one wall portion is provided with the above-mentioned reference hole portion 3a as a rectangular hole portion, which constitutes the fulcrum portion with the reference supporting member 40. Moreover, each of the other two wall portions is provided with the above-mentioned axial elongated hole portion 3b elongated in the optical axis direction and the above-mentioned circumferential elongated hole portion 3c elongated in the circumferential direction.

The reference supporting member 40 has a cylindrical supporting portion 40b which is lightly press-fitted into the reference hole portion 3a. The reference hole portion 3a has a rectangular shape when viewed in the axial direction of the reference supporting member 40. The reference hole portion 3a makes contact with, at its two inner surfaces in the optical axis direction and its two inner surfaces in the circumferential direction, the cylindrical supporting portion 40b of the reference supporting member 40. This configuration prevents movements of the front lens holding frame 3 with respect to the rear lens holding frame 4 in the optical axis and circumferential directions and allows rotation of the front lens holding frame 3 about the reference supporting member 40 in directions in which the tilting amount of the front lens holding frame 3 with respect to the rear lens holding frame 5 increases and decreases.

The reference supporting member 40 is allowed to move in its axial direction with respect to the reference hole portion 3a. Therefore, the front lens holding frame 3 is allowed to translate in directions, including the axial direction of the reference supporting member 40, in which its decentering amount with respect to the rear lens holding frame 4 increases and decreases, that is, in the directions orthogonal to the reference optical axis. With this configuration, the fulcrum portion constituted by the reference supporting member 40 and the reference hole portion 3a also serves as a guiding portion that allows the translation (parallel movement) of the front lens holding frame 3 while preventing displacement thereof in the optical axis direction.

Moreover, the decentering adjusting eccentric cam 41 and the tilting adjusting eccentric cam 42 respectively include eccentric cam portions (first and second eccentric portions) 41b and 42b eccentric with respect to the center portions 41a and 42a. The eccentric cam portion 41b of the decentering adjusting eccentric cam 41 is inserted into the axially elongated hole portion 3b to make contact (engage) with inner surfaces thereof in the circumferential direction. Thus, rotation of the decentering adjusting eccentric cam 41 enables translation of the front lens holding frame 3 and the front group lens L1 in the decentering correction direction. The decentering adjusting eccentric cam 41 and the axially elongated hole portion 3b constitute a decentering adjustment portion.

On the other hand, the eccentric cam portion 42b of the tilting adjusting eccentric cam 42 is inserted into the circumferentially elongated hole portion 3c to make contact (engage) with inner surfaces thereof in the optical axis direction. Thus, rotation of the tilting adjusting eccentric cam 42 enables rotational movement of the front lens holding frame 3 and the front group lens L1 about the fulcrum portion (that is, the reference supporting member 40 and the reference hole portion 3a) in the tilting correction direction. The tilting adjusting eccentric cam 42 and the circumferentially elongated hole portion 3c constitute a tilting adjustment portion.

As described above, the reference hole portion 3a and the reference supporting member 40 engaging therewith serves as one fulcrum portion common to both the decentering adjusting portion and the tilting adjusting portion. Therefore, as shown in FIG. 5, one pair of one of the two decentering adjusting eccentric cams 41 and one of the two tilting adjusting eccentric cams 42 and another pair of the other of the two decentering adjusting eccentric cams 41 and the other of the two tilting adjusting eccentric cams 42 are respectively arranged in two phase ranges away from the reference supporting member 40 by 120° in both sides of the circumferential direction. With this arrangement, the one pair of the decentering adjusting eccentric cam 41 and the tilting adjusting eccentric cam 42 and the other pair of the decentering adjusting eccentric cam 41 and the tilting adjusting eccentric cam 42 also have an interval of 120° in the circumferential direction. This equal interval arrangement can hold the front lens holding frame 3 most stably, which is desirable. However, such an equal interval arrangement is not necessarily needed to be employed.

Moreover, in the equal interval arrangement, the paired decentering and titling adjusting eccentric cams 41 and 42 are arranged adjacent to each other. In this embodiment, the mutually adjacent decentering and titling adjusting eccentric cams 41 and 42 are arranged such that central axes of their center portions 41a and 42a (eccentric axes of the eccentric cam portions 41b and 42b) extend in parallel with each other. This is because of using a same slide mold to form in the rear lens holding frame 4 the hole portions into which the center portions 41a and 42a are inserted and of using another same slide mold to form in the front lens holding frame 3 the elongated hole portions 3b and 3c with which the eccentric cam portions 41b and 42b engage. Such use of the same slide molds enables decrease of number of the slide molds for forming the front and rear lens holding frames 3 and 4 and simplification of mold structure, which makes it possible to improve part accuracy and reduce mold cost.

Moreover, since the central axes of the eccentric cam portions 41b and 42b of the paired decentering and tilting adjusting eccentric cams 41 and 42 extend in the same direction, directions in which a tool for rotating these eccentric cams 41 and 42 is inserted when decentering/tilting adjustment is performed become same, which facilitate for an adjuster to perform the decentering/tilting adjustment. However, such parallel arrangement of the paired decentering and tilting adjusting eccentric cams 41 and 42 is not necessarily needed.

Figure 8:
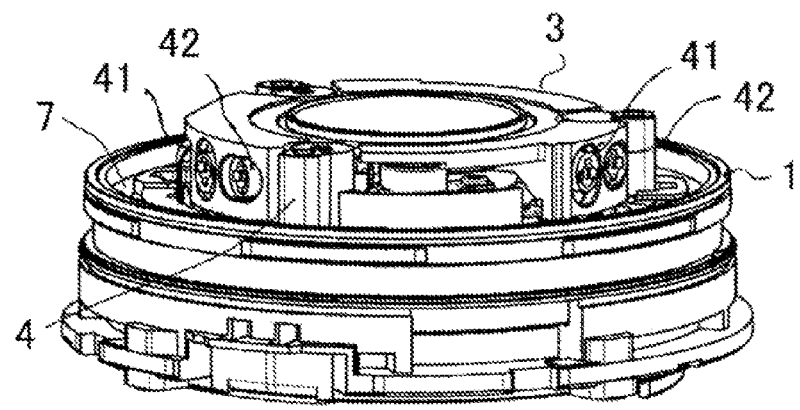
FIG. 8 is a perspective view showing the interchangeable lens when decentering and tilting adjustments are performed by the adjustment mechanism.
Figure 9:
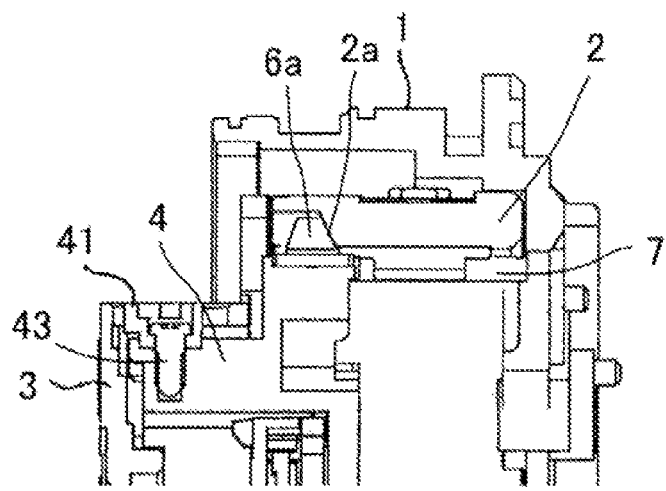
FIG. 9 is a partial sectional view of the interchangeable lens when the decentering and tilting adjustments are performed by the adjustment mechanism.

FIGS. 8 and 9 show the front/rear lens unit in a state where the decentering/tilting adjustment is performed. In this state, the cam follower 6a fixed to the rear lens holding frame 4 engages with the tapered cam groove portions 2a formed in the cam ring 2 disposed inside the fixed barrel 1. Moreover, the front/rear lens unit is moved out (protruded) from the fixed barrel 1 and the guiding barrel 7 in the optical axis direction by rotation of the cam ring 2 such that the decentering and tilting eccentric cams 41 and 42 (eccentric cam portions 41b and 42b) are exposed on an outside of the fixed barrel 1. In other words, this embodiment employs a configuration allowing the adjuster to move the front/rear lens unit out from the fixed barrel 1 to expose the eccentric cams 41 and 42 on the outside of the fixed barrel 1 before exterior parts such as the exterior ring 17, the fixed position rotative ring 8 and the focus operating ring 10 are attached to the fixed barrel 1. This configuration eliminates necessity of providing, in the exterior parts and the fixed barrel 1, openings or holes dedicated for the decentering/tilting adjustment, which is advantageous for strength of the fixed barrel 1.

Figure 14:
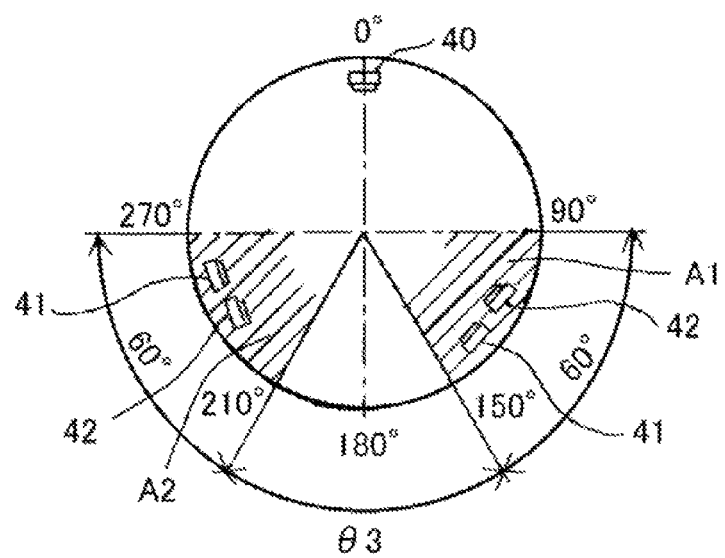
FIG. 14 shows arrangement of the fulcrum portion, the decentering adjustment portion and the tilting adjustment portion in the decentering/tilting adjustment mechanism in Embodiment 1.

Moreover, it is only necessary that (the central axes of) the one pair of the decentering and tilting adjusting eccentric cams 41 and 42 be located, as shown in FIG. 14, within a range A1 (first circumferential range) of 60° from a position of 90° to a position of 150° in the circumferential direction when the position of (the central axis of) the reference supporting member 40 is defined as 0°. Furthermore, it is only necessary that (the central axes of) the other pair of the decentering and tilting adjusting eccentric cams 41 and 42 be located within a range A2 (second circumferential range) of 60° from a position of 210° to a position of 270° in the circumferential direction with respect to the 0° position.

In other words, it is only necessary that the first and second circumferential ranges A1 and A2 be separated away from the reference supporting member 40 (that is, the fulcrum portion) by 90° or more and be separated away from each other by 60° (θ3) or more. This arrangement makes each of separation angles among three members (that is, the reference supporting member 40 and the two decentering adjusting eccentric cams 41) deciding a decentering position of the front lens holding frame 3 and each of separation angles among three members (that is, the reference supporting member 40 and the two tilting adjusting eccentric cams 42) deciding a tilting angle of the front lens holding frame 3 smaller than 180°. Therefore, this arrangement enables stable holding of the front lens holding frame 3 as well as the above-mentioned equal interval arrangement.

In addition, this embodiment employs a configuration in which the reference supporting member 40 and the four decentering and tilting adjusting eccentric cams 41 and 42 are all arranged on a same plane orthogonal to the reference optical axis (that is, on a same plane parallel to the decentering correction direction). This configuration enables decrease of an arrangement space for the decentering/tilting adjustment mechanism in the optical axis direction in the front/rear lens unit, which is advantageous for miniaturization of the front/rear lens unit and thus of the interchangeable lens.

It is not necessarily needed that all of the reference supporting member 40 and the four decentering and tilting adjusting eccentric cams 41 and 42 be arranged on the same plane orthogonal to the reference optical axis. However, it is desirable that the reference supporting member 40 and the two tilting adjusting eccentric cams 42 be arranged on the same plane orthogonal to the reference optical axis. With this arrangement, rotations of the tilting adjusting eccentric cam 42 in clockwise and counterclockwise directions by a same rotation amount cause the front lens holding frame 3 to tilt in directions opposite to each other by a same tilting angle, which facilitates the tilting adjustment.

Moreover, it is desirable that the decentering adjusting eccentric cams 41 be arranged away from the reference supporting member 40 by 120° in the circumferential direction and be arranged such that their axial directions (that is, the central axes of the center portions 41a) extend toward the reference optical axis. With this arrangement, rotations of the decentering adjusting eccentric cam 41 in the clockwise and counterclockwise directions by a same rotation amount cause the front lens holding frame 3 to translate in directions opposite to each other by a same translation amount, which facilitates the decentering adjustment.

Figure 10:
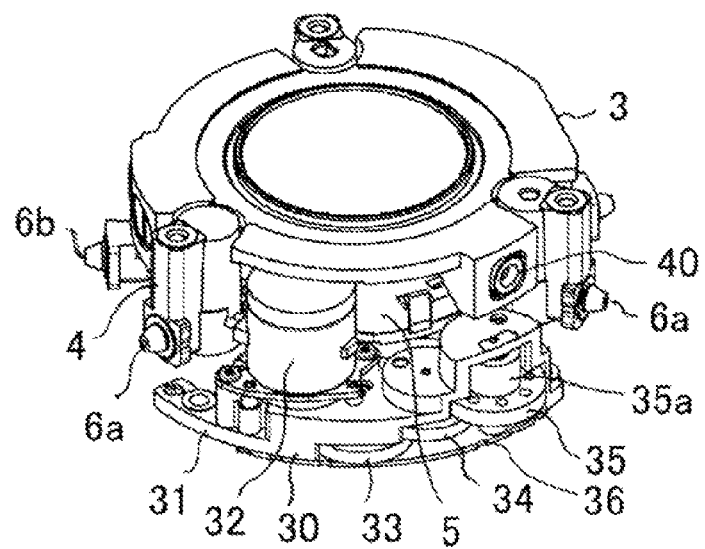
FIG. 10 is perspective view showing the front/rear lens unit and a motor unit.

FIG. 10 shows the motor unit 30. The motor unit 30 includes a base plate 31, a stepping motor 32 fixed to the base plate 31 with screws, a pinion gear (not shown) fixed to an output shaft of the motor 32 and a first deceleration gear 33 meshing with the pinion gear. A second deceleration gear 34 meshes with the first deceleration gear 33, and a third deceleration gear 35 meshes with the second deceleration gear 34. The third deceleration gear 35 is provided with an output gear 35a coaxial therewith. The gears 33 to 35 (35a) are held between the base plate 31 and a retainer plate 36 fixed to the base plate 31 with screws.

The base plate 31 of the motor unit 30 is fixed to the guiding barrel 7 with screws. The output gear 35a meshes with an inner gear (not shown) provided in an inner circumferential part of the cam ring 2. Therefore, rotation of the motor 32 rotates the cam ring 2 and thereby the front/rear lens unit is integrally moved in the optical axis direction.

FIG. 10 shows a state where the front/rear lens unit is moved to its rearmost position (that is, to the infinite end). In this state, the motor unit 30 is located within a same range as that where the electromagnetic aperture stop unit 5 and the rear lens holding frame 4 are located in the optical axis direction. In other words, the motor unit 30 is disposed more outside than the electromagnetic aperture stop unit 5 and the rear lens holding frame 4 in the radial direction.

In order to achieve an interchangeable lens having a reduced total length, this embodiment employs a configuration in which the motor unit 30 is disposed more outside than the electromagnetic aperture stop unit 5 and the rear lens holding frame 4 in the radial direction and between the two cam followers 6a as shown in FIG. 10. This configuration allows, as shown in FIG. 14, only one reference supporting member 40 among the reference supporting member 40 and the four eccentric cams 41 and 42 to be disposed in a circumferential range from the 90° position through the 0° position (position of the reference supporting member 40) to the 180° position. Therefore, this configuration enables securement of a sufficient arrangement space for the motor unit 30 between the two cam followers 6a. Moreover, in order to dispose the motor unit 30 more outside than the electromagnetic aperture stop unit 5 and the rear lens holding frame 4 in the radial direction, it is necessary to form the rear lens holding frame 4 to have a shape in which part thereof close to the motor unit 30 is largely removed, which may cause a problem that strength of a portion of the rear lens holding frame 4 for holding other members near the removed part is decreased. However, the configuration in this embodiment in which only one reference supporting member 40 is disposed between the two cam followers 6a hardly cause such a strength problem.

Embodiment 2

Figure 11:
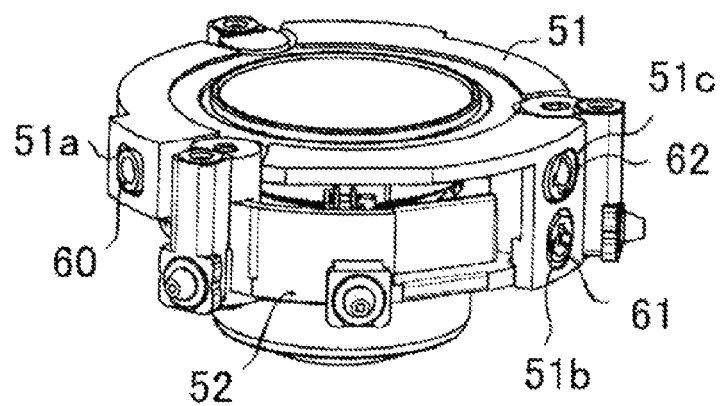
FIG. 11 is a perspective view of a front/rear lens unit provided with a decentering/tilting adjustment mechanism, in an interchangeable lens that is Embodiment 2 of the present invention.
Figure 12:
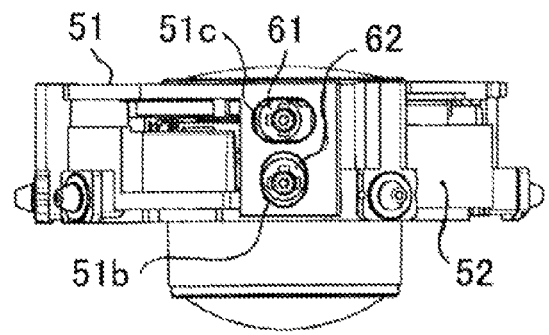
FIG. 12 is a side view of the front/rear lens unit in Embodiment 2.

FIGS. 11 and 12 show a front/rear lens unit provided with a decentering/tilting adjustment mechanism in an interchangeable lens that is a second embodiment (Embodiment 2) of the present invention. FIG. 11 shows the front/rear lens unit when viewed from an oblique direction, and FIG. 12 shows the front/rear lens unit when viewed from an axial direction of an eccentric cam described later. In this embodiment, components identical to or components having identical roles to those of Embodiment 1 are denoted by same names with different reference numerals.

Reference numeral 51 denotes a front lens holding frame, and 52 a rear lens holding frame. Reference numeral 60 denotes a reference supporting member, which is fixed to the rear lens holding frame 52. Reference numeral 51a denotes a reference hole portion formed in the front lens holding frame 51; the reference supporting member 60 is inserted thereinto and engages therewith. Also in this embodiment, as well as in Embodiment 1, the one reference supporting member 60 is only provided so as to constitute one fulcrum portion common to both decentering adjustment portion and tilting adjustment portion.

Reference numeral 61 denotes two decentering adjusting eccentric cams, whose center portions are fixed at two circumferential places in the rear lens holding frame 52, different from that of the reference supporting member 60. Eccentric cam portions of the decentering adjusting eccentric cams 61 engage with axially elongated hole portions 51b formed in the front lens holding frame 51. Moreover, reference numeral 62 denotes two tilting adjusting eccentric cams, whose center portions are fixed at two circumferential places in the rear lens holding frame 52, different from that of the reference supporting member 60. Eccentric cam portions of the tilting adjusting eccentric cams 62 engage with circumferentially elongated hole portions 51c formed in the front lens holding frame 51.

This embodiment employs a configuration in which one of the two decentering adjusting eccentric cams 61 and one of the two tilting adjusting eccentric cams 62 are arranged parallel to the optical axis direction (that is, at a same position in the circumferential direction) and in which the other of the two decentering adjusting eccentric cams 61 and the other of the two tilting adjusting eccentric cams 62 are arranged parallel to the optical axis direction. This configuration is effective for a case of requiring a wide circumferential space in an outer periphery of the front/rear lens unit.

Also in this embodiment, as well as in Embodiment 1, it is desirable to arrange the reference supporting member 60 and the two tilting adjusting eccentric cams 62 on a same plane orthogonal to the reference optical axis.

Moreover, it is desirable to arrange the two decentering adjusting eccentric cams 61 circumferentially away from the reference supporting member 60 by 120° and such that axial directions of the decentering adjusting eccentric cams 61 extend toward the reference optical axis.

Embodiment 3

Figure 13:
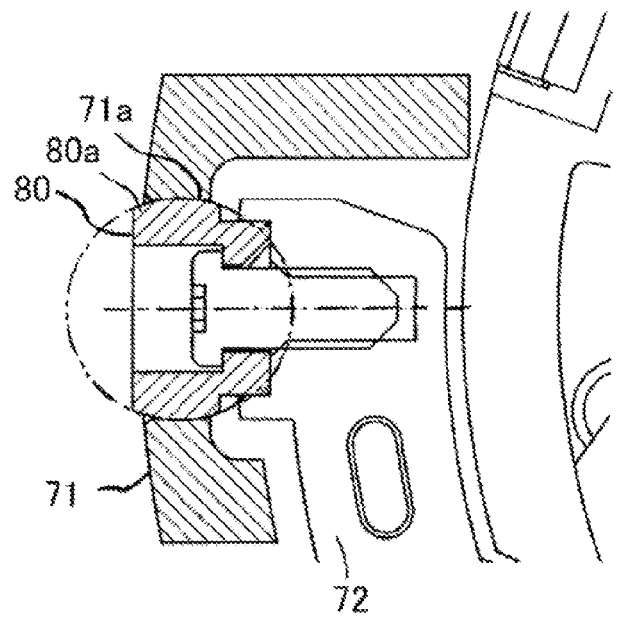
FIG. 13 is a partial sectional view showing a centering/tilting adjustment mechanism provided with an interchangeable lens that is Embodiment 3 of the present invention.

FIG. 13 shows a cross-section of a front/rear lens unit provided with a decentering/tilting adjustment mechanism in an interchangeable lens that is a third embodiment (Embodiment 3) of the present invention. In this embodiment, components identical to or components having identical roles to those of Embodiment 1 are denoted by same names with different reference numerals.

Reference numeral 71 denotes a front lens holding frame, and 80 a reference supporting member fixed to a rear lens holding frame 72. Reference numeral 71a denotes a reference hole portion formed in the front lens holding frame 71; the reference supporting member 80 is inserted thereinto and engages therewith. Also in this embodiment, as well as in Embodiment 1, the one reference supporting member 80 is only provided so as to constitute one fulcrum portion common to both decentering adjustment portion and tilting adjustment portion.

In this embodiment, part of the reference supporting member 80 which makes contact with an inner surface of the reference hole portion 71a formed in the front lens holding frame 71 is formed as a spherical portion 80a whose outer surface is a convex spherical surface. On the other hand, the inner surface of the reference hole portion 71a is formed as a cylindrical surface whose axial direction extends in an axial direction of the reference supporting member 80.

In the case where, as described in Embodiments 1 and 2, the outer circumferential surface of the reference supporting member is formed as the cylindrical surface, the tilting adjustment causes the cylindrical surface of the reference supporting member to tilt from a state where the cylindrical surface of the reference supporting member is in contact with four inner surfaces of the rectangular reference hole portion. In this case, part around the reference hole portion of the front lens holding frame or part holding the eccentric cam in the rear lens holding frame receives load, which may cause deformation of these part or decrease a tilting adjustable range of the front lens holding frame.

However, in this embodiment providing the convex spherical surface to the reference supporting member 80, the reference hole portion 71a allows smooth rotation of the reference supporting member 80 with rotational movement of the front lens holding frame 3. Therefore, it is possible to prevent the above-mentioned deformation of the front lens holding frame 3 caused by the tilting adjustment, and to allow the tilting adjustment in a wide tilting adjustable range.

Moreover, in the decentering adjustment, the reference hole portion 71a whose inner cylindrical surface extends in the axial direction of the reference supporting member 80 allows movement of the reference supporting member 80 in its axial direction, which enables the decentering adjustment in any direction orthogonal to the reference optical axis, including the axial direction of the reference supporting member 80. The reference hole portion (cylindrical surface) 71a of the front lens holding frame 71 is formed so as to have a larger axial length of the cylindrical surface than a maximum movement amount of the reference supporting member 80 in the decentering adjustment.

The reference hole portion 71a may be formed as a rectangular hole portion as well as in Embodiments 1 and 2.

As described above, each of Embodiments 1 to 3 employs the configuration in which the only one reference supporting member constitutes one fulcrum portion common to the decentering adjustment portion and the tilting adjustment portion, which enables further miniaturization of the front/rear lens unit as compared with conventional ones and thereby achieves miniaturization of the interchangeable lens provided with the front/rear lens unit.

Furthermore, each of Embodiments 1 to 3 configures the decentering/tilting adjustment mechanism by the one fulcrum portion, the two first adjusting members for the decentering adjustment and the two second adjusting members for the tilting adjustment, which enables stable decentering and tilting adjustments of the front group lens L1 with a compact configuration. Therefore, each of Embodiments 1 to 3 achieves a compact optical apparatus having high optical performance.

Although each of Embodiments 1 to 3 described the case of performing the decentering and tilting adjustments of the holding member that holds the lens as an optical element, the optical element may be various elements whose decentering and tilting should be adjusted, including not only the lens, but also an aperture stop, an optical filter and an image sensor. Moreover, although each of Embodiments 1 to 3 described the interchangeable lens as an optical apparatus, the optical apparatus may be various apparatus that can be provided with a decentering/tilting adjustment mechanism similar to that described in each of Embodiments 1 to 3, including a lens-integrated camera, an observation apparatus such as binoculars, and an image projection apparatus such as a liquid crystal projector.

Furthermore, the present invention is not limited to these embodiments and various variations and modifications may be made without departing from the scope of the present invention.

This application claims the benefit of Japanese Patent Application No. 2012-112299, filed on May 16, 2012, which is hereby incorporated by reference herein in its entirety.

What is claimed is:

1. An optical apparatus comprising:
   a first holding member holding an optical element;
   a second holding member holding the first holding member; and
   an adjustment mechanism that adjusts positions of the first holding member in a decentering correction direction and in a tilting correction direction with respect to the second holding member,
   wherein the adjustment mechanism comprises:
   a fulcrum portion provided at one place in a circumferential direction of the first and second holding members and connecting the first and second holding member to allow movements of the first holding member in the decentering correction direction and the tilting correction direction with respect to the second holding member;
   two decentering adjustment portions provided at two places other than that of the fulcrum portion in the circumferential direction and each causing the first holding member to move in the decentering correction direction with respect to the second holding member in response to rotation of a first adjusting member including a first rotation center portion about which the first adjusting member is rotated and a first eccentric portion eccentric with respect to the first rotation center portion; and
   two tilting adjustment portions provided at two places other than that of the fulcrum portion in the circumferential direction and each causing the first holding member to move in the tilting correction direction with respect to the second holding member in response to rotation of a second adjusting member provided with a second rotation center portion about which the second adjusting member is rotated and a second eccentric portion eccentric with respect to the second rotation center portion.

2. An optical apparatus according to claim 1, wherein:
   in the circumferential direction, one of the two decentering adjustment portions and one of the two tilting adjustment portions are provided in a first circumferential range, and the other of the two decentering adjustment portions and the other of the two tilting adjustment portions are provided in a second circumferential range, and the first and second circumferential ranges are both away from the fulcrum portion by 90° or more and are away from each other by 60° or more.

3. An optical apparatus according to claim 1, wherein the two decentering adjustment portions and the two tilting adjustment portions are provided on a same plane passing through the fulcrum portion and being parallel with the decentering correction direction.

4. An optical apparatus according to claim 1, wherein, in the circumferential direction, one of the two decentering adjustment portions and one of the two tilting adjustment portions are provided at a same position, and the other of the two decentering adjustment portions and the other of the two tilting adjustment portions are provided at another same position.

5. An optical apparatus according to claim 1, wherein the two tilting adjustment portions are provided on a same plane passing through the fulcrum portion and are parallel with the decentering correction direction.

6. An optical apparatus according to claim 1, wherein:

the first rotation center portion of the first adjusting member included in one of the two decentering adjustment portions and the second rotation center portion of the second adjusting member included in one of the two tilting adjustment portions extend parallel with each other, and the first rotation center portion of the first adjusting member included in the other of the two decentering adjustment portions and the second rotation center portion of the second adjusting member included in the other of the two tilting adjustment portions extend parallel with each other.

7. An optical apparatus according to claim 1, wherein:

the fulcrum portion is configured so that a spherical portion provided in the first holding member engages with a hole portion provided in the second holding member, and the hole portion allows rotation of the spherical portion with the movement of the first holding member in the tilting correction direction and allows the movement of the first holding member in the decentering correction direction.

\* \* \* \* \*